United States Patent
Judell

(10) Patent No.: US 9,473,257 B1
(45) Date of Patent: Oct. 18, 2016

(54) RADIO COMMUNICATION SYSTEM UTILIZING A RADIO SIGNAL CLASSIFIER

(71) Applicant: DRS ICAS, LLC, Fort Walton Beach, FL (US)

(72) Inventor: Neil Judell, Cambridge, MA (US)

(73) Assignee: DRS ADVANCED ISR, LLC, Fort Walton Beach, FL (US)

(*) Notice: Subject to any disclaimer, the term of this patent is extended or adjusted under 35 U.S.C. 154(b) by 0 days.

(21) Appl. No.: 14/932,882

(22) Filed: Nov. 4, 2015

Related U.S. Application Data

(60) Provisional application No. 62/088,348, filed on Dec. 5, 2014.

(51) Int. Cl.
| | | |
|---|---|---|
| *H04B 17/00* | (2015.01) | |
| *H04B 17/20* | (2015.01) | |
| *H04W 24/02* | (2009.01) | |

(52) U.S. Cl.
CPC .......... *H04B 17/20* (2015.01); *H04W 24/02* (2013.01)

(58) Field of Classification Search
CPC ..... H04W 24/04; H04W 4/046; H04W 4/20; H04W 24/02; H04W 48/04; H04W 4/08; H04W 52/42; H04W 64/003; H04W 64/006; H04W 72/042; H04B 17/345; H04B 17/391; H04B 1/10; H04B 1/1676; H04B 1/719; H04B 7/01; H04B 7/082; H04B 7/0888

USPC ........................................................ 455/67.11
See application file for complete search history.

(56) References Cited

U.S. PATENT DOCUMENTS

| | | | |
|---|---|---|---|
| 2003/0228851 A1* | 12/2003 | Taniguchi | H04B 7/0888 455/126 |
| 2005/0020278 A1* | 1/2005 | Krumm | G01S 5/0252 455/456.1 |
| 2014/0155085 A1* | 6/2014 | Kosseifi | H04W 24/10 455/456.1 |
| 2014/0235192 A1* | 8/2014 | Purnhagen | G10L 19/008 455/296 |

\* cited by examiner

*Primary Examiner* — Ajibola Akinyemi
(74) *Attorney, Agent, or Firm* — Kilpatrick Townsend & Stockton LLP

(57) ABSTRACT

A system suitable for use in classifying radio signals includes a plurality of feature extractors configured to extract a plurality of features from an object and a plurality of classification layers. Each of the plurality of classification layers includes one or more reduced enhanced Gaussian classifiers selected from a plurality of Gaussian classifiers based on a classification error rate of each of the plurality of Gaussian classifiers and configured to classify the object as belonging to an object class in a subgroup of correctly classified object classes or in a disjoint error subgroup that needs further classification, using at least one of the extracted plurality of features. If the object is classified as belonging to an object class in a disjoint error subgroup at a layer, the object is passed on to a different reduced enhanced Gaussian classifier in a next layer for further classification.

22 Claims, 11 Drawing Sheets

RADIO COMMUNICATION SYSTEM UTILIZING A RADIO SIGNAL CLASSIFIER

CROSS-REFERENCES TO RELATED APPLICATIONS

The present application claims priority to and is a non-provisional application of U.S. Provisional Patent Application No. 62/088,348, entitled "Layered Estimated Probability Classifier," filed Dec. 5, 2014, the entire contents of which are hereby incorporated by reference for all purposes.

BACKGROUND OF THE INVENTION

There are many different types of radio signals according to various radio communication standards, such as, for example, amplitude modulation (AM) voice signals, frequency modulation (FM) voice signals, FM-broadcast signals, Link-11 military transmission signals, Global System for Mobile Communications (GSM) phone signals, or code division multiple access (CDMA) phone signals. In commercial and military communication systems, such as a military aircraft communication system or a commercial airborne communication system, it is often desirable to detect and monitor a radio signal of a particular communication standard, and, in response to detecting the radio signal, communicate using the particular communication standard.

SUMMARY OF THE INVENTION

Embodiments of the present disclosure relate to the field of radio communication. More specifically, embodiments of the present disclosure provide methods and systems for radio communication using a radio signal classifier.

According to an embodiment of the present invention, a method of radio signal identification using a layered radio signal classifier is provided. The method includes receiving a plurality of training data samples of radio signals. The plurality of training data samples includes radio signals from a plurality of radio signal classes. The method also includes extracting a plurality of training features from each of the plurality of training data samples. The method further includes determining mutual information between each training feature of the plurality of training features and a radio signal classification decision for the plurality of radio signal classes, and ranking the plurality of training features based on the mutual information. A plurality of Gaussian classifiers can be designed using the plurality of training features based on the ranking of the plurality of training features. From the plurality of Gaussian classifiers, a Gaussian classifier with the lowest classification error rate for the plurality of training data samples may be selected as a reduced enhanced Gaussian classifier for a first layer.

The plurality of training data samples can be classified using the reduced enhanced Gaussian classifier for the first layer, and a confusion matrix summarizing the radio signal classes that training data samples from each radio signal class are classified as may be generated. Based on the confusion matrix, a disjoint error subgroup of radio signal classes can be identified. A rate of misclassification of training data samples from each radio signal class of the disjoint error subgroup of radio signal classes is above a first threshold, and a rate of misclassification between radio signal classes within the disjoint error subgroup and radio signal classes outside of the disjoint error subgroup is below a second threshold value. A different reduced enhanced Gaussian classifier in a lower layer may be designed for the disjoint error subgroup of radio signal classes.

The method further includes receiving a target radio signal to be classified, extracting a plurality of target features from the target radio signal, and classifying the target radio signal as belonging to a radio signal class in a subgroup of correctly classified radio signal classes or in the disjoint error subgroup that needs further classification, using the reduced enhanced Gaussian classifier for the first layer and at least one of the plurality of target features. When the target radio signal is classified as belonging to a radio signal class in the disjoint error subgroup, the different reduced enhanced Gaussian classifier in the lower layer for the disjoint error subgroup can be used to further classify the target radio signal.

According to another embodiment of the present invention, a method of designing a layered classifier for object classification is provided. The method includes receiving a plurality of training data samples including objects from a plurality of object classes to be classified in a layer of the layered classifier, and extracting a plurality of features from each of the plurality of training data samples. The method also includes determining mutual information between each feature of the plurality of features and an object classification decision for the plurality of object classes, and ranking the plurality of features based on the mutual information. Based on the ranking of the plurality of features, a plurality of Gaussian classifiers can be designed using the plurality of features. From the plurality of Gaussian classifiers, a Gaussian classifier with the lowest classification error rate for the plurality of training data samples is selected as a reduced enhanced Gaussian classifier for the layer.

According to yet another embodiment of the present invention, a layered reduced enhanced Gaussian classifier is provided. The layered reduced enhanced Gaussian classifier includes a plurality of feature extractors configured to extract a plurality of features from an object, and a plurality of classification layers. Each of the plurality of classification layers includes one or more reduced enhanced Gaussian classifiers. Each of the one or more reduced enhanced Gaussian classifiers is selected from a plurality of Gaussian classifiers based on a classification error rate of each of the plurality of Gaussian classifiers, and is configured to classify the object as belonging to an object class in a subgroup of correctly classified object classes or in a disjoint error subgroup that needs further classification, using at least one of the extracted plurality of features. When the object is classified as belonging to an object class in a disjoint error subgroup at a layer, the object is passed on to a different reduced enhanced Gaussian classifier in a next layer for further classification.

Numerous benefits are achieved by way of the present invention over conventional techniques. For example, embodiments of the present invention are easy to implement, can typically be done with a few hundred lines or less of source code, use a small amount of storage for the classification engine, can automatically reject features that do not help with classification, and permit examination of the learning process, which may aid in the design of the feature set. These and other embodiments of the invention along with many of its advantages and features are described in more detail in conjunction with the text below and attached figures.

DETAILED DESCRIPTION OF SPECIFIC EMBODIMENTS

Figure 1:
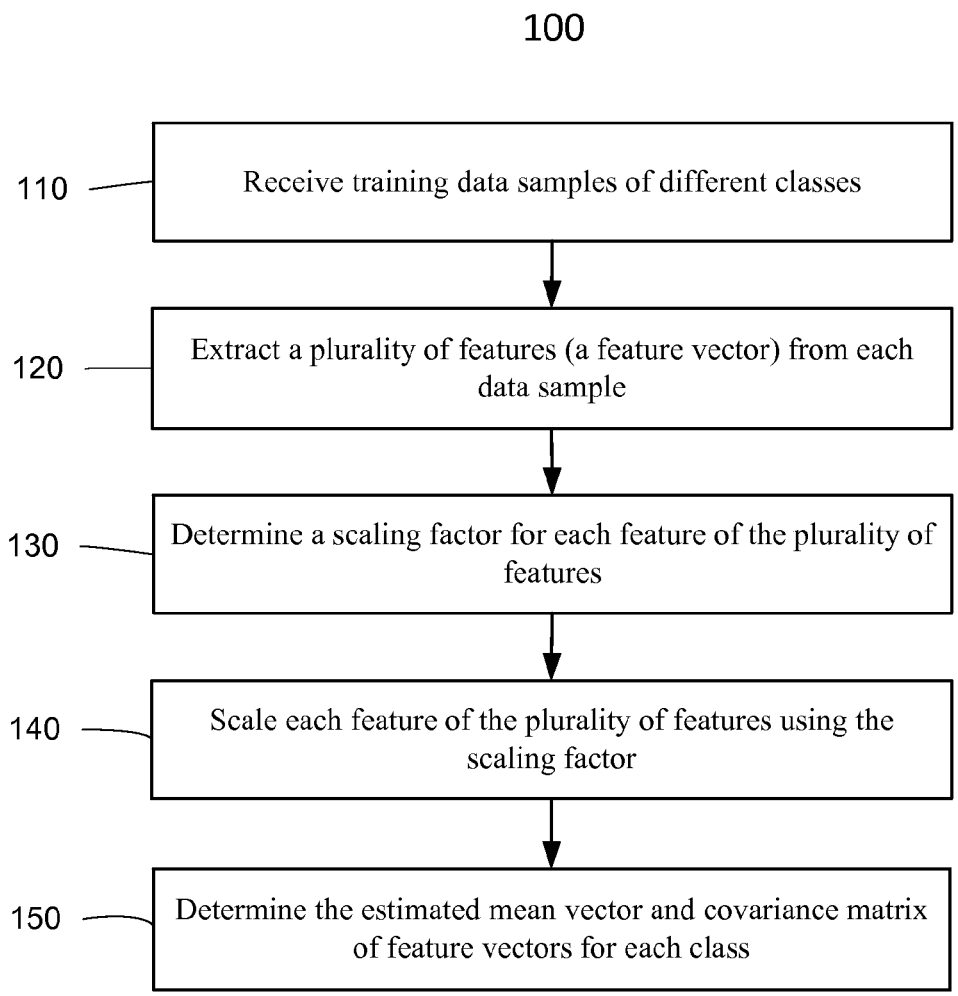
FIG. 1 is a flow chart illustrating a method of training a classifier for object classification.

There are more than 100 radio communication standards, each using a different class of radio signals. In a radio communication system such as an airborne communication system, it is often desirable to detect radio signals of a particular communication standard, monitor the radio signals, and/or communicate using radio signals of the particular communication standard.

Some classes of radio signals have similar characteristics and thus are difficult to distinguish. Furthermore, probability functions of radio signals from different sources may not be known. A large data sample may often be needed in order to properly classify a radio signal. Thus, it is desirable to have an efficient and accurate classifier for radio signal classification.

The problem of object classification with a large number of possible object classes is a difficult one. Modern classifiers, for example, maximum a-posteriori (MAP) classifiers and maximum likelihood (ML) classifiers, attempt to minimize probability of classification error. An MAP classifier computes an a-posteriori probability function p(A|X) that represents the probability that an object of type A was sent, given a received object vector X for each possible type of objects, and picks the type with the largest a-posteriori probability. An ML classifier, on the other hand, uses likelihood function p(X|A) that represents the probability of receiving an object vector X when the transmitted object was type A. One can generally obtain a fair approximation to the likelihood function. However, the a-posteriori probability is typically more difficult to compute, and depends on an a-priori probability p(A) that an object of type A was sent with no other information, based on Bayes' rule as described below in Equation 2. In many cases, such as most electronic warfare scenarios, the a-priori probability is unknown. Thus, it is may be impractical to use MAP classifiers with unknown a-priori probabilities for different classes. In such scenarios, it is usually assumed that the a-priori probability functions for different classes are all equal, which results in a maximum likelihood classifier.

Embodiments of the present disclosure provide techniques for classification of radio frequency signals. Techniques disclosed herein are not limited to the classification of radio frequency signals (e.g., automatic classification) and may be used for classifying other objects, such as photographs, spectrograms, other complex objects, or the like. In various embodiments, mutual information between each feature of a plurality of features extracted from objects of a plurality of classes and an object classification decision (or the plurality of classes) is determined, and the plurality of features is ranked based on the determined mutual information. A best classifier is then selected from a plurality of classifiers, each with a different combination of features selected based on the ranking of the plurality of features. A confusion matrix may be generated based on the classification results using the selected best classifier. Classes that cannot be sufficiently distinguished by the selected best classifier are grouped into disjoint error subgroups of classes based on their cross misclassifications. A best classifier for each disjoint error subgroup of classes on a lower layer is determined using ranked features based on mutual information between each feature of the plurality of features and a classification decision for classes in each disjoint error subgroup, until all classes of the plurality of classes can be classified with an acceptable error rate.

Methods and systems disclosed herein have a number of advantages over other classification methods. First, the methods and systems are easy to implement, requiring no more than a few hundred lines of code in many embodiments. Second, the methods and systems use a small size of storage memory, typically less than a few hundred numerical values for each class to be identified. Third, the methods and systems leave out features that do not help distinguishing objects of different classes, thus reducing dimensionality of the classifier. Furthermore, the methods and systems can provide a list of possible classifications with a confidence level for each possible classification. In addition, it is relatively easy to determine root causes for classification errors; thus appropriate features and a corresponding feature extraction method can be selected or designed.

I. Machine Learning

The goal of a machine learning technique is to construct a prediction model that extracts useful knowledge from training data, and uses it to make inferences about future arrival data. This can be formulated as an optimization problem: given a set of training data X, find a model W that minimizes the error of a prediction function F(X, W). Generally, a machine learning technique approaches this problem iteratively, starting from an initial model, such as a random model, and refining the model gradually as more and more data is processed.

In machine learning, the efficiency and accuracy of the generated model depend heavily on the dataset used to train the machine model. Complex models are usually able to capture the knowledge hidden in training data. To one extreme, however, a model may "memorize" all the information contained in the data. In such case, the model can give a correct prediction for any sample it has seen before, but may perform poorly for unseen samples. This is called over-fitting, that is, a model fits its training data well, but does not generalize to others. By using more data, a model can generalize the learned knowledge sufficiently, reducing the risk of over-fitting.

A machine learning system may include an input layer, one or more hidden layers, and an output layer. The input layer of a machine learning system takes input in the form of a dataset of instances. An instance refers to an individual, independent sample of the dataset. There can be one or more hidden layers. Each hidden layer can apply a function to an output of the previous layer to produce another output. The output of a machine learning system is the description of the knowledge that has been learned. How the specific outcome of the learning process is represented (the syntax and semantics) depends largely on the particular machine learning approach being used.

Existing machine learning techniques can be categorized by the intended structure of the model. Most machine learning techniques fall into the categories of supervised, unsupervised, and reinforcement learning. In supervised learning, machine learning techniques are provided with a labeled training dataset. This dataset is used to build the system model representing the learned relation among the input, output and system parameters. In contrast to supervised learning, unsupervised learning techniques are not provided with labels, that is, there is no output vector in the training dataset. The goal of an unsupervised learning technique is to classify samples into different groups or clusters by investigating the similarity between the input samples. In reinforcement learning techniques, the system learns by interacting with its environment. Some machine learning techniques do not naturally fit into any of these three categories because they share characteristics of two or more of the three learning methods. These hybrid techniques aim to inherit the strengths of these main categories, while minimizing their weaknesses. As described herein, some embodiments of the present invention use a supervised learning system as described more fully herein.

Supervised learning creates knowledge structures that support the task of classifying new instances into pre-defined classes. The name "supervised learning" comes from the fact that output classes are pre-defined in the training dataset. The learning machine is provided with a collection of sample instances, pre-classified into classes. Output of the learning process is a classification model that is constructed by examining and generalizing from the provided instances. In effect, supervised learning focuses on modeling the input/output relationships. Its goal is to identify a mapping from input features to an output class. The knowledge learned, for example, commonalities among members of the same class and differences between competing ones, can be presented as a flowchart, a decision tree, classification rules, etc., that can be used later to classify a new unseen instance.

There are two major phases in supervised learning:

Training phase, which is the learning phase that examines the provided data (training dataset) and constructs (builds) a classification model; and Classifying phase, where the model that has been built in the training phase is used to classify unseen instances.

For example, let TS be a training dataset, which includes a set of input/output pairs, TS={<$x_1$, $y_1$>, <$x_2$, $y_2$>, ... <$x_M$, $y_M$>}, where $x_i$ is a vector of values of input features corresponding to the ith instance, and $y_i$ is an output class value of the ith instance. The goal of classification can thus be formulated as follows: from a training dataset TS, find a function f(x) that best predicts the outcome of the output class y for any new unseen values of x. The output takes its value in a discrete set {$y_1$, $y_2$, ..., $y_M$} that consists of all pre-defined class values. The function f(x) is the core of the classification model. The model created during training can be improved if both instances that belong to class(es) of interest and instances known to not be members of the class(es) of interest are provided. This can enhance the model's ability to identify instances belonging to the class(es) of interest.

There are a number of supervised learning classification techniques, such as K-nearest neighbor (KNN), decision trees, Naïve Bayes, logistic regression and support vector machine (SVM), each differing mainly in the way the classification model is constructed and the optimization algorithm is used to search for a good model. Other supervised learning techniques may include linear or polynomial and random forests.

Supervised learning techniques use pre-defined classes of training instances. In contrast, unsupervised learning techniques are not provided with this guidance; instead, they discover natural clusters (groups) or association in the data using, for example, internalized heuristics. Unsupervised learning techniques may include association analysis, clustering and dimensionality reduction, and hidden Markov model.

II. Object Classification

In general, classifiers are built using a training/test methodology. A number of samples of objects are collected. These samples may be divided into two pools: a training set and a test set. The training set may be used to build the classifier, and the test set may be used to evaluate how well the classifier works. In some embodiments, the training set and the test set may be the same.

An object to be tested or classified, such as a sample of a radio signal, a photograph, a spectrogram, or other complex object, is given to the classifier. The object to be classified may include a large set of data. For example, a photo may include tens of millions of pixels, and a snippet of a radio signal may include several millions of data samples. The classifier may include a set of feature extractors, which produce a set of parameters or features that characterize the object. The data size of the features or parameters of an object is usually much smaller than the original data size of the object. For example, for a radio signal, the extracted features may include about 20 to about 100 statistical values, such as signal bandwidth, nth order cumulants, peak signal amplitude, mean signal amplitude, instantaneous frequency, phase, spectral symmetry metric, sideband symmetry metric, phase angle spread, levels of amplitude shift keying (ASK) modulation, fast Fourier transform (FFT) components for frequency shift keying (FSK) modulation, ratio of symbol rate to bandwidth, and coherence metrics. The features or parameters may be represented by numbers, or more often, in vectors or matrices, which may be referred to as the feature vector corresponding to the object. The classifier then takes the feature vector as input, and produces an output that classifies the object. For example, for an X-ray backscatter image of a person at an airport, the classification output may be "non-threat," "gun present," "knife present," or "explosive present." For a radio signal classifier, the classification output may be one of more than 100 different possible classes, such as, for example, AM-voice signals, FM-voice signals, FM-broadcast signals, Link-11 military transmission signals, GSM phone signals, or CDMA phone signals. It is desired that the classifier be as accurate as possible.

A. Training

FIG. 1 is a flow chart illustrating a method of training a classifier for object classification, according to some embodiments of the present disclosure. As shown in FIG. 1, training the classifier may include: (1) receiving training data samples of a plurality of classes at block 110; (2) extracting a plurality of features (or a feature vector) from each training data sample at block 120; (3) determining a scaling factor for each feature of the plurality of features at block 130; (4) scaling each feature of the extracted plurality of features using the scaling factor at block 140; and (4) determining estimated mean vector and covariance matrix of feature vectors for each class of the plurality of classes at block 150. The training data samples may be samples of radio signals, photographs, spectrograms, or many other complex objects that can be categorized into different classes. The training data samples include data samples of objects in each class of the plurality of classes, and may include a very large set of data points. More detailed descriptions of feature extraction, feature scaling, and classifier design are provided below.

1. Feature Extraction

Figure 2:
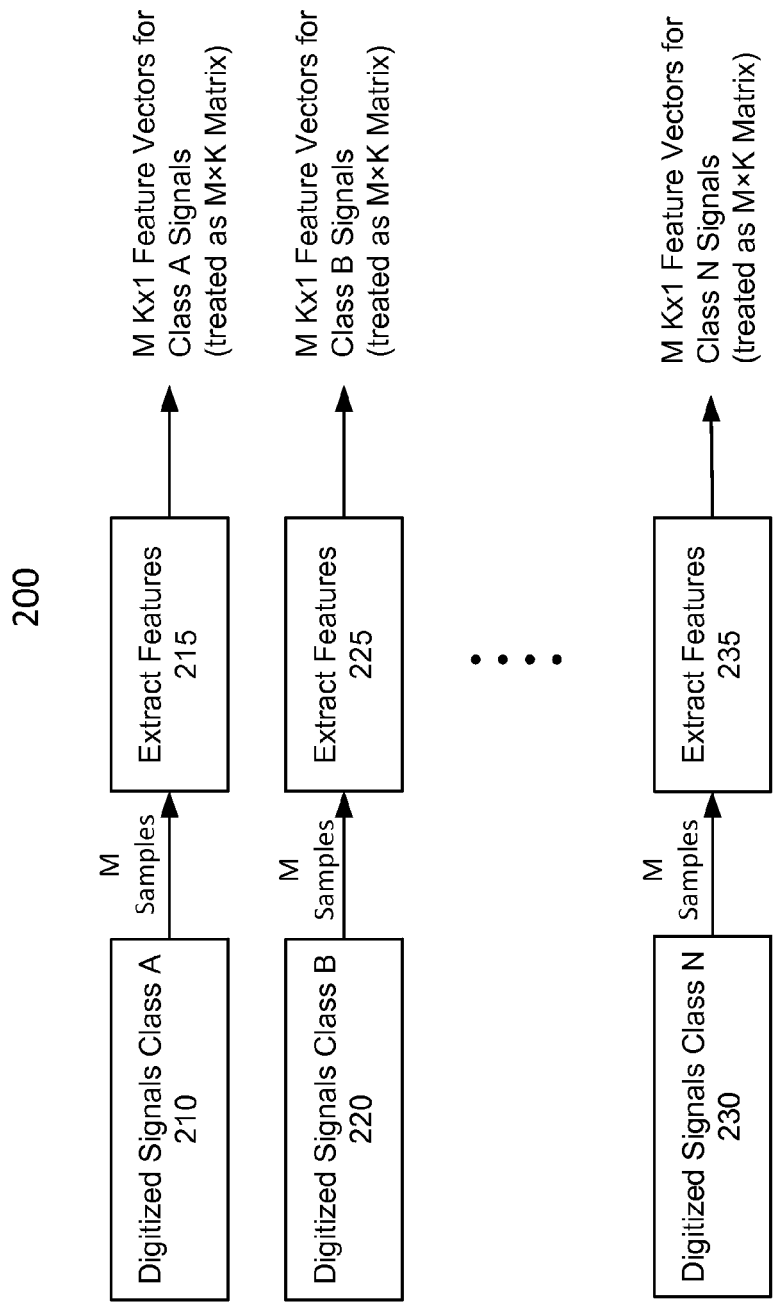
FIG. 2 illustrates a block diagram of feature extraction from training data samples.

FIG. 2 is a block diagram 200 illustrating an example of feature extraction from training data samples, such as radio frequency signals. The training data samples shown in FIG. 2 include data samples of objects from N different classes, such as radio signals, including, for example, AM-voice signals, FM-voice signals, FM-broadcast signals, Link-11 military transmission signals, GSM phone signals, or CDMA phone signals. At block 210, samples of class A signals may be captured or received, and digitized for data processing. The digitized class A signals may include M samples, where M may be in the order of 10, $10^2$, $10^3$, $10^6$, $10^9$ or larger. Each sample of the M digitized samples is processed by a set of feature extractors at block 215, where each feature extractor may extract one or more features of a sample. Thus, if the set of feature extractors is designed to extract K different features, K features represented by a K×1 vector may be extracted for each sample of class A signal, and M K×1 feature vectors, or a M×K feature matrix may be extracted from M samples of class A signals.

Similarly, samples of class B, . . . or class N signals may be captured or received, and digitized at block 220, . . . or block 230. Samples of digitized class B, . . . or class N signals may include the same number of samples as class A signals, or may include different number of samples than class A signals. In any case, it is desirable to have a large sample size for each signal class in order to build a more accurate classifier. The feature vectors of digitized class B, . . . or class N signal samples may be extracted at block 225, . . . or block 235 by the set of feature extractors to extract the same K features from each sample, such that M K×1 feature vectors, or a M×K feature matrix may be extracted from M samples of class B, . . . or class N signals. A training system may include one or more of the set of feature extractors, such that samples of the same signal class or different signal classes may be processed in parallel to reduce process time and improve efficiency when a large number of samples are used and/or when there are training data samples from a large number of classes.

It should be noted that, even though FIG. 2 illustrates that M samples are used for each class, different numbers of samples can be used for different classes. For example, 1000 samples of object class A may be used, but only 300 samples may be used for another object class B. Thus, object class A may be represented by a 1000×K feature matrix, while object class B may be represented by a 300×K feature matrix. Accordingly, FIG. 2 is merely exemplary and the present invention is not limited to the particular embodiment illustrated in FIG. 2. One of ordinary skill in the art would recognize many variations, modifications, and alternatives.

2. Feature Scaling

In many classifiers, the values of different features may be in different ranges and may vary drastically. For example, the nth order cumulants feature of radio signals may be on the order of $10^{11}$, $10^{12}$, or larger, the bandwidth feature of radio signals may be in the order of $10^3$ to $10^6$ Hz or larger, while the spectral efficiency feature of radio signals may be within a range of between 1 and 2. Thus, it is desirable to scale extracted values of each feature such that the ranges of spread or distribution of values for different features are similar, for example, each having a unity variance.

A pre-scaling may be performed on the feature vectors extracted by the set of feature extractors. A gain value for each feature can be determined from the extracted feature vectors, and used to scale the feature vectors, so that the variance of each feature over the feature vectors extracted from all training data samples can be scaled to unity. As a result, the spread of values of each feature from all training data samples is approximately the same.

Figure 3:
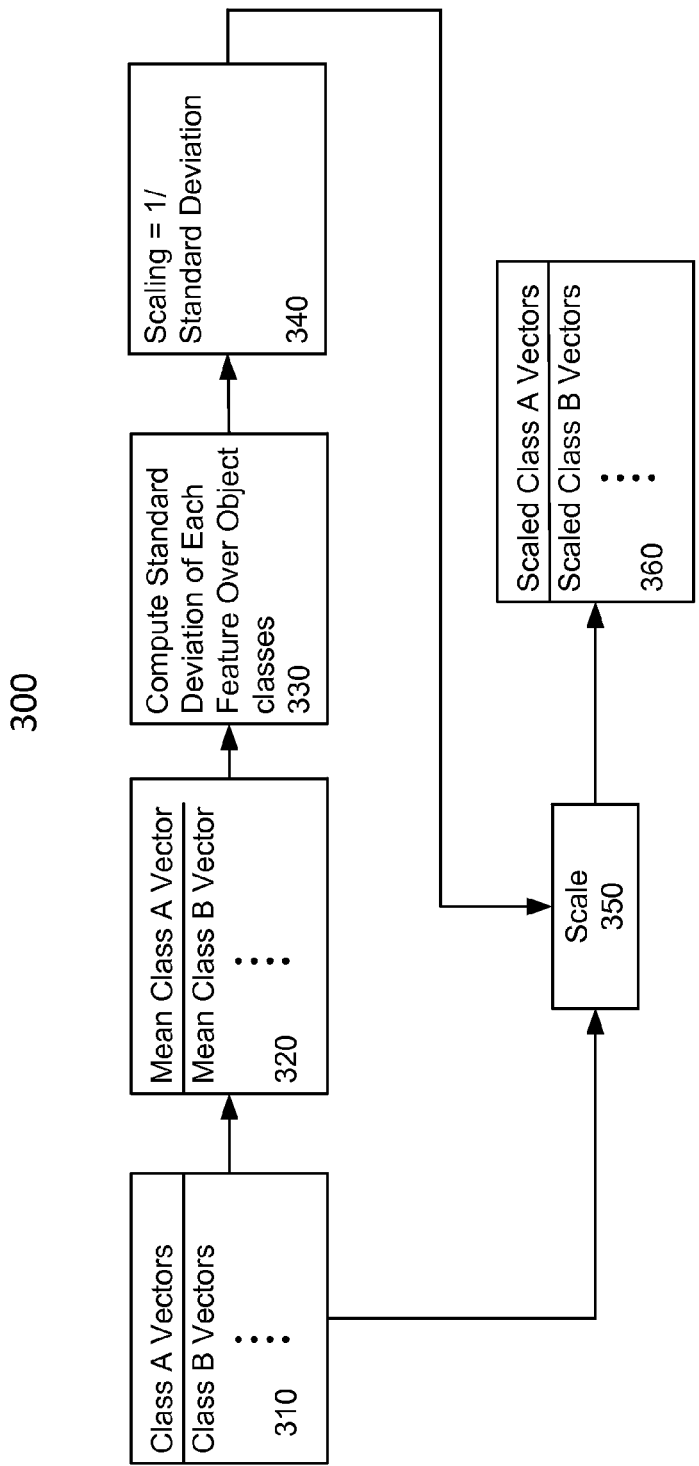
FIG. 3 is a flow chart illustrating a method of feature vector scaling.

FIG. 3 is a flow chart 300 illustrating a method of feature vector scaling. At block 310, feature vectors of training data samples from different object classes are provided by or received from feature extractors. At block 320, feature vectors of training data samples from objects in each class, such as objects in Class A, are averaged to generate a mean feature vector for Class A, where each feature in the mean feature vector is an average of values of corresponding feature in feature vectors of training data samples from objects in Class A. Similarly, feature vectors of training data samples from objects in each of other classes, such as Class B, are averaged to generate a mean feature vector for the class. At block 330, the standard deviation of values of each feature in the feature vectors for training data samples from all classes is calculated. At block 340, a scaling factor for each feature in all classes is determined as the reciprocal of the calculated standard deviation for each feature. At block 350, the values of each feature in the feature vectors of the training data samples are scaled using corresponding scaling factor to generate scaled feature vectors as shown in block 360, such that the ranges of spread or distribution of feature values for different features are similar, for example, each having a unity variance.

3. Classifier Design

Classifiers may use various decision techniques to minimize the probability of classification error. For example, if an a-posteriori probability density function, that is, the probability that a received object Y is of class or type X, is known, a maximum a-posteriori (MAP) classifier may be designed to compute the a-posteriori probabilities of the received object for each type, and choose the type with maximum a-posteriori probability $$P_{type|object}(\text{type}|Y) \quad (1)$$

If a-priori probabilities of various types or classes are known, an MAP classifier may be designed using Bayes' Rule $$P_{type|object}(\text{type}|Y) = \frac{P_{type}(\text{type})P_{object|type}(Y|\text{type})}{P_{object}(Y)}, \quad (2)$$

where $P_{object|type}$ (Y|type) is the conditional probability or likelihood function that an object of a type is an object Y, $P_{type}$ (type) is the a-priori probability that an object is an object of a type, and $P_{object}$ (Y) is the probability that an object is an object Y. For example, if $P_{type}$ (type) is the a-priori probability of a person having cancer, $P_{object|type}$ (Y|type) is the probability of a cancer patient is 70-year old, and $P_{object}$ (Y) is the probability of a person being 70-year old, the a-posteriori probability $P_{type|object}$ (type|Y) that a 70-year-old person has cancer can be estimated using Equation 2. Note that the denominator $P_{object}$ (Y) on the right-hand side of Equation 2 is independent of object type or may only involve a scale factor between object types. Thus, to choose a type with maximum a-posteriori probability as the classifier output, a type that can maximize the numerator of the right-hand side of Equation 2 can be chosen.

In various embodiments, the a-priori probabilities of different object types $P_{type}$ (type) may not be known. In such embodiments, a maximum likelihood (ML) classifier may be used, which assumes that the a-priori probability $P_{type}$ (type) of any given type is the same as the a-priori probability of any other type, and chooses the type that has a maximum likelihood function $P_{object|type}$ (Y|type) as the classification result.

Embodiments of the present disclosure may use either a MAP classifier if the a-priori or a-posteriori probabilities of different object types are known, or a ML classifier otherwise.

In many situations, the likelihood function $P_{object|type}$ (Y|type) is unknown, and, frequently, even the form of the likelihood function is unknown. How various machine learning techniques deal with such situation is what differentiates one machine learning technique from another.

In some embodiments, Gaussian distributions may be close approximations to the actual likelihood functions. A multi-dimensional (or multivariate) Gaussian (or normal) probability density function of an object type $$P(\vec{x}) = \frac{e^{-\frac{(\vec{x}-\vec{x}_{mean})^t R^{-1}(\vec{x}-\vec{x}_{mean})}{2}}}{2(\pi)^{N/2}|R|^{1/2}}, \quad (3)$$

can thus be used to estimate the probability (or confidence number) that an object with a feature vector $\vec{x}$ is an object of the object type, where $\vec{x}_{mean}$ is the mean feature vector value of objects of the object type, or the expectation value or empirical value of $\vec{x}$, that is, $$\vec{x}_{mean} = E(\vec{x}), \quad (4)$$

and R is the covariance matrix of feature vectors of objects of the object type:

$$R = E((\vec{x}-\vec{x}_{mean})_t(\vec{x}-\vec{x}_{mean})), \quad (5)$$

which may contain information about how different features relate to each other.

To calculate the multi-dimensional Gaussian probability density function of each object type, all feature vectors of training data samples from objects of each object type are extracted first as described above. From these feature vectors, the mean vector value and the covariance matrix for each object type can be estimated by:

$$\vec{x}_{mean-estimated,Y} = \frac{\sum_{\vec{x}_i \text{ is type } Y} \vec{x}_i}{\text{Number of training vectors of type } Y}, \text{ and} \quad (6)$$

$$R_{estimated,Y} = \frac{\sum_{x_i \text{ is type } Y} (\vec{x}_i - \vec{x}_{mean-estimated,Y})(\vec{x}_i - \vec{x}_{mean-estimated,Y})^t}{\text{Number of training vectors of type } Y} \quad (7)$$

As shown in Equation 3, to determine the likelihood function, the estimated covariance matrix R needs to be inverted. In addition, the determinant of the estimated covariance matrix R is used in the denominator. Therefore, the estimated covariance matrix R needs to be a "well-conditioned" invertible matrix. However, the estimated covariance matrix is usually not well-conditioned. For example, if the number of training data samples is not a large multiple of the number of features used to characterize the training data samples, the covariance matrix is likely to be poorly conditioned. If the actual distributions of some features are small, the covariance matrix is likely to be poorly conditioned too. Numerical methods, such as Tikhonov regularization, may be used to stabilize or condition the covariance matrix, such that $$R_{estimated,Y} = \quad (8)$$

$$\frac{\sum_{x_i \text{ is type } Y} (\vec{x}_i - \vec{x}_{mean-estimated,Y})(\vec{x}_i - \vec{x}_{mean-estimated,Y})^t}{\text{Number of training vectors of type } Y} + \lambda I,$$

where $\lambda$ is a small positive value, and I is an identity matrix.

Based on Equation 3, the object type that provides the maximum estimated probability (or confidence level) for a given feature vector $\vec{x}$ may then be selected as the classification output.

In some embodiments, the classifier may start by using only one feature, rather than using all features.

B. Classification

Figure 4:
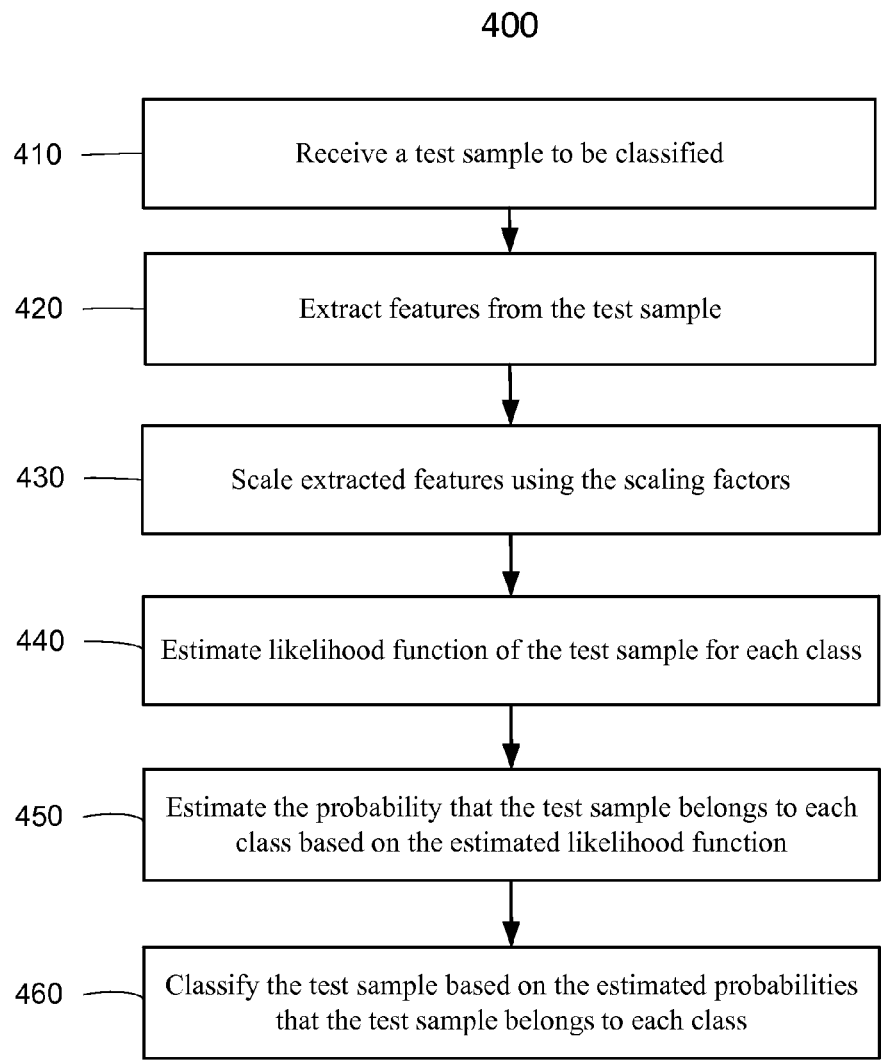
FIG. 4 is a flow chart illustrating a method of classifying test samples.

FIG. 4 is a flow chart 400 illustrating a method of classifying a test sample, according to some embodiments of the present disclosure. The classification method may include: (1) receiving the test sample at block 410; (2) extracting features or feature vector from the test sample at block 420, using feature extractors such as the ones described at blocks 215, 225 or 235 of FIG. 2; (3) scaling extracted features or feature vector at block 430 using corresponding scaling factors as described above with respect to FIG. 3; (4) estimating the likelihood function for each class at block 440 using appropriate classifier(s) as described above in Section II(A)(3); (5) estimating the probability or confidence level that the test sample is an object of each class of all possible classes at block 450, based on the estimated likelihood function for each class; and (6) classifying the test sample as an object of a class at block 460 based on the maximum estimated probability or confidence level.

The probability that the test sample is an object of each class of all possible classes may be estimated using methods described above. For example, if a-priori probabilities are known, a-posteriori estimates can be calculated using Bayes' rule described in Equation 2. In some other embodiments, estimated means and covariances may be used to estimate likelihood function using Equation 3 for each class, which is then used to determine the probability or confidence level for each class. The estimated probability for each class may be sorted, and the class with the largest estimated probability may be chosen as the classification result. In some embodiments, the classification result may indicate the probability that the test sample is an object of a class for several top classes in the sorting result. In some embodiments, if the estimated probabilities for all classes are less than a threshold value, the classifier may indicate that the received test sample does not match features of any class closely enough, and may classify the test sample as "unidentified."

III. Layered Classifier

For many object classes, the assumption that the joint distribution of features is Gaussian may not be accurate, thus classification results based on Gaussian assumption may have higher than acceptable error rates. In some embodiments of the present disclosure, a layered classifier may be used to improve classification accuracy, such that objects that cannot be accurately classified in one layer may be further classified in a next layer with a different classifier until they can be classified with a sufficient confidence level. The layered classifier may begin with the assumption that Gaussian distribution is a good approximation to the likelihood function, even though it may not be an ideal one. However, as the layer goes deeper and the number of object classes to be classified becomes smaller in a layer, the Gaussian assumption may become more accurate, and thus the classifier becomes more accurate as fewer less accurate assumptions are being made.

Furthermore, since the layered classifier does not need to distinguish objects of all classes in a single layer, some features may not be relevant for the classification in a layer. In some embodiments, features may be ranked and selected based on their relevancy such that features that are less relevant to the classification in a layer may not be needed in that layer and therefore can be ignored in the classifier for that layer. This results in a dimensionality reduction, such that the amount of data processing and data storage in each layer can be reduced.

A. Training

Figure 5:
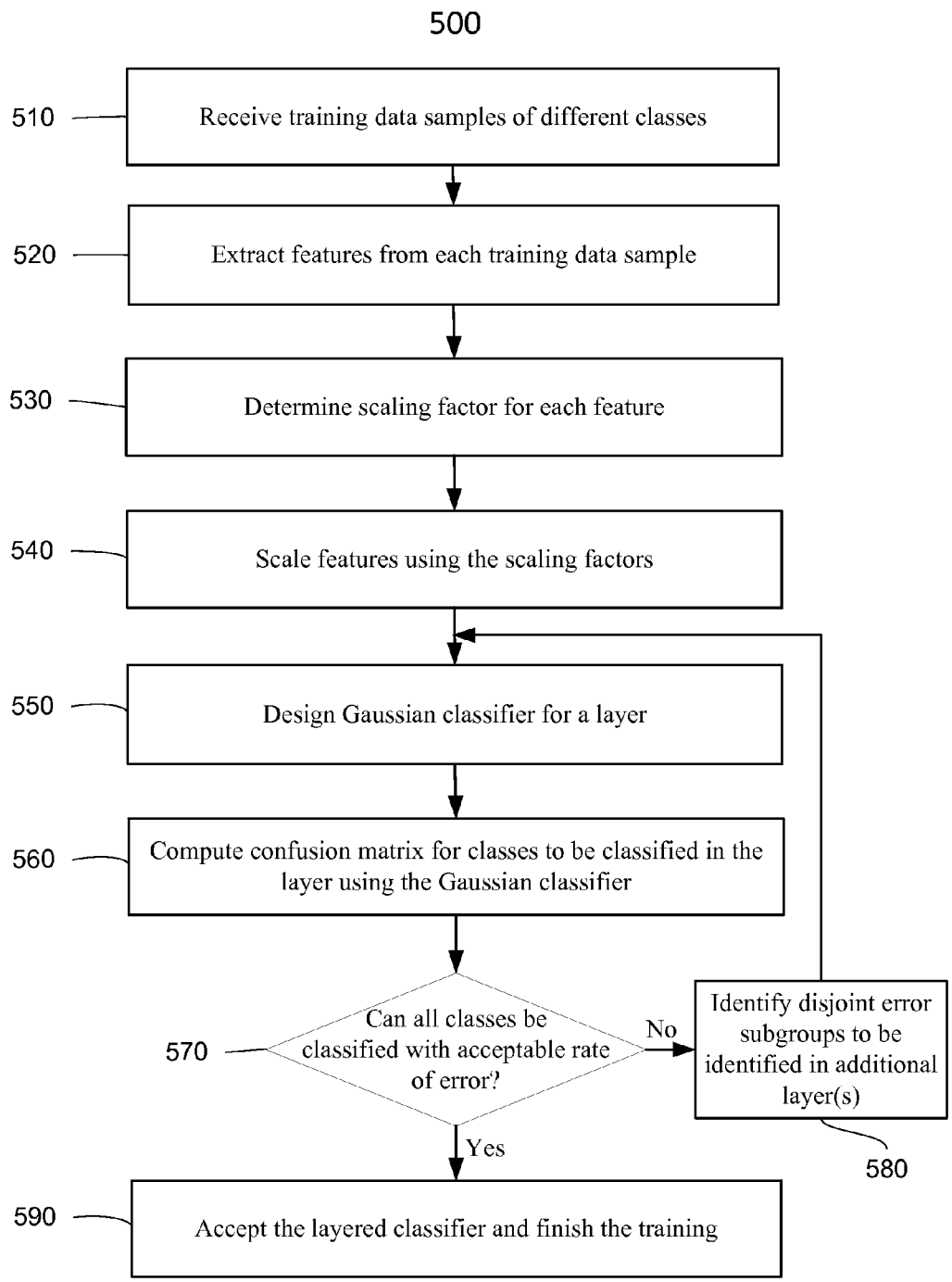
FIG. 5 is a flow chart illustrating a method of building a layered Gaussian classifier using training data samples.

FIG. 5 is a flow chart 500 illustrating a method of building a layered Gaussian classifier, such as a layered, reduced, and enhanced Gaussian classifier, using training data samples. As shown in FIG. 5, in some embodiments of the present disclosure, the training process that builds the layered Gaussian classifier may include some processes similar to the ones described in FIG. 1, such as (1) receiving training data samples of different classes at block 510; (2) extracting features or feature vector from each training data sample at block 520; (3) determining a scaling factor for each feature at block 530; and (4) scaling the feature values extracted from all training data samples using the scaling factor for the feature at block 540. The methods of extracting features and scaling feature values may be similar to the methods described above with respect to FIGS. 1-3.

The training process that builds the layered Gaussian classifier as illustrated in FIG. 5 may also include designing Gaussian classifier(s) for a layer at block 550; generating a confusion matrix for classes to be classified in the layer using the Gaussian classifier at block 560; determining whether all classes can be classified with an acceptable error rate at block 570 based on the confusion matrix; if some classes cannot be classified with the acceptable error rate, identifying disjoint error subgroup(s) to be classified in additional layer(s) at block 580, and repeating the processes performed at blocks 550, 560, and 570 for each disjoint error subgroup at the additional layer(s) with training data samples from member classes of each disjoint error group; and if all classes can be classified with acceptable error rates, accepting the layered classifier and finishing the training process at block 590. In some embodiments, if no class can be classified with an acceptable error rate at the first layer, which may mean that the classes cannot be distinguished by currently defined features, and additional feature(s) may need to be extracted using new feature extractor(s), the training process is terminated. Embodiments of the processes performed at blocks 550-590 are described in more details below.

1. Reduced Enhanced Gaussian Classifier

Embodiments of the present disclosure describes methods of designing a Gaussian classifier, more specifically, a reduced enhanced Gaussian classifier, for a layer in the layered Gaussian classifier. Most methods of Gaussian classifier design assume that covariance matrices for all object classes are identical, thus the covariance matrix is used for all object classes. This may not be a valid assumption for many cases. Embodiments of the present disclosure use enhanced Gaussian classifiers, where one covariance matrix is used for each object class, rather than a single covariance matrix for all object classes.

Figure 6:
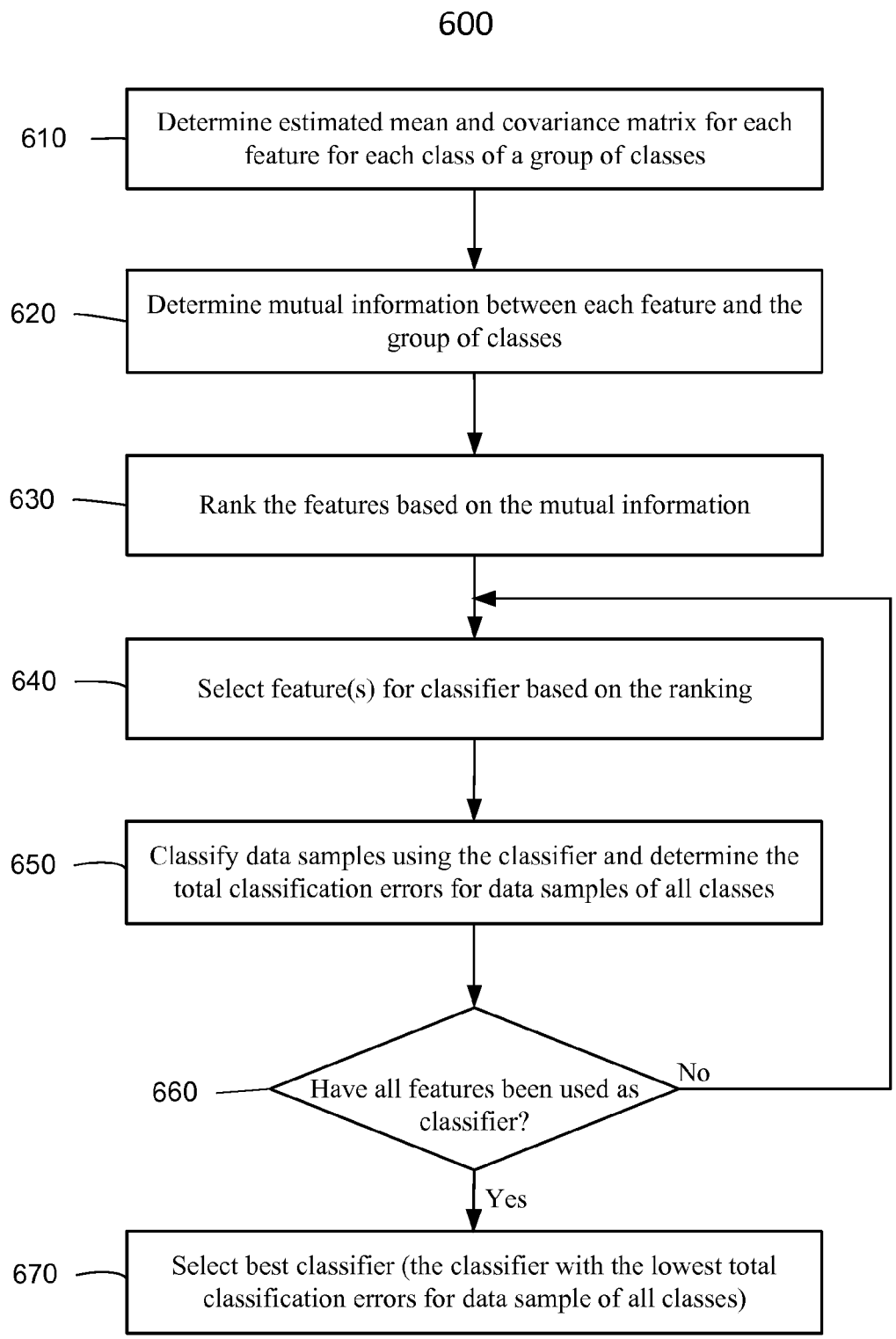
FIG. 6 is a flow chart illustrating a method of determining a reduced enhanced Gaussian classifier.

FIG. 6 is a flow chart 600 illustrating a method of designing a reduced enhanced Gaussian classifier at a layer for a group of object classes. At block 610, estimated mean vector and covariance matrix for feature vectors are determined for each object class, using Equation 4 and Equation 5, as described above with respect to block 150 of FIG. 1.

At block 620, mutual information between each feature and an object classification decision (or the group of object classes) in the layer is determined. The mutual information is computed numerically, using histograms to estimate probability density functions. For each feature in the feature vector, the mutual information between the feature and the object classification decision can be determined by:

$$I_{feature\ Number} = \sum_{types} \int_{feature\ values} p(\text{value, type}) \log\left(\frac{p(\text{value, type})}{p(\text{type})p(\text{value})}\right) d\text{value}. \quad (8)$$

The mutual information describes the correlation between a feature and a group of object classes or types, and quantitatively describes how well the feature can be used to distinguish the group of object classes. If the mutual information between a feature and the group of object classes is zero, adding that feature into the classifier would not help to improve the accuracy of the classification. On the other hand, if the mutual information between a feature and the group of object classes is maximized, such as close to 1, this single feature may be sufficient to classify any object from the group of object classes.

At block 630, after the mutual information between each feature and the group of object classes is determined, features in the feature vector can be ranked in descending order of the mutual information. Features used in a layer can then be selected based on the ranking At block 640, an enhanced Gaussian classifier may be built with features selected based on the ranking. For example, the enhanced Gaussian classifier may start with using the feature with the highest mutual information. In some embodiments, the enhanced Gaussian classifier may start with using the top two features with the highest mutual information.

At block 650, training data samples are classified using the enhance Gaussian classifier built at block 640, and compared against their actual classes. The total number of classification errors is counted.

At block 660, whether all features have been used in a classifier is determined. This may be done by comparing a loop counter with the total number of features in the feature vector. If it is determined that all features have been used, a best classifier, for example, the classifier with the lowest total number of classification errors can be selected as the classifier for the layer at block 670. If some features have not been used in a classifier yet, a new classifier can be designed using, for example, the top three features with the highest mutual information, the top four features with the highest mutual information, and so on, until all features have been used. Thus, if, for example, there are 27 features in a feature vector, 27 different classifiers may be built and tested with different feature combinations. The classifier with the lowest total number of classification errors among the 27 classifiers may be selected as the best classifier for the group of object classes at the layer. Such classifier is a reduced enhanced Gaussian classifier because the number of features used in the classifier is reduced from a full-dimension enhanced Gaussian classifier where all features are used in the classifier. The reduced enhanced Gaussian classifier is at least as good as the original, full-dimension enhanced Gaussian classifier.

It is noted that although the above method selects the top feature with the highest mutual information, the top two features with the highest mutual information, the top three features with the highest mutual information, and so on, until all features are selected in a classifier, other methods may be used to select the features for each classifier. For example, features may be grouped to determine the mutual information between the group of features and the group of classes, and features may be ranked and used by groups. In some embodiments, features may not be selected solely based on their ranking according to the mutual information, other factors, such as the cross correlation between features, may be used to select the features. In some embodiments, the features may be selected randomly. In some embodiments where the number of features in the feature vector is small, all different combinations of features may be used in the classifiers.

2. Confusion Matrix

After the reduced enhanced Gaussian classifier for the group of classes at a layer is selected, a confusion matrix for the group of classes may be constructed. The confusion matrix is a scoring matrix describing how well the classifier works on different object classes. For example, if an object may belong to one of 100 different classes, the confusion matrix may be a 100×100 matrix. Each row of the confusion matrix may correspond to an actual class of the training data samples, and each column of the confusion matrix may correspond to the number of training data samples of each actual object class that are classified as belonging to each object class using the classifier. Thus, each element in the confusion matrix represents how many times the classifier classifies objects from actual class X as belonging to class Y. An example of a 4×4 confusion matrix for four object classes—A, B, C and D—is shown in Table 1, where, for example, 100 training data samples from each object class are classified by the classifier. The classification results of the training data samples from each object class are summarized in each row. For example, among the 100 class A training data samples, 99 of them are correctly classified as class A, and one of them is misclassified as class D. Among the 100 class B training data samples, 90 of them are correctly classified as class B, and 10 of them are misclassified as class C.

TABLE 1

| Actual/Classified | A | B | C | D |
|---|---|---|---|---|
| A | 99 | 0 | 0 | 1 |
| B | 0 | 90 | 10 | 0 |
| C | 0 | 7 | 93 | 0 |
| D | 4 | 0 | 0 | 96 |

The confusion matrix may be examined to identify classes that have classification error rates greater than an acceptable error rate, such as 5%, and need to be further classified in additional layers using different classifier(s) with different feature combination(s). For example, in the example shown in Table 1, samples of class B have an error rate of 10%, while samples of class C have an error rate of 7%. Thus, both classes B and C have error rates greater than the acceptable error rate of 5%. Samples of class A have an error rate of 1%, while samples of class D have an error rate of 4%, both having error rates less than the acceptable error rate of 5%. Therefore, the classifier can probably correctly identify objects from classes A and D, but not objects from classes B and C, with an acceptable confidence level.

The confusion matrix also shows that the classifier may misclassified objects of class B as class C, but not as class A or D. Similarly, the classifier may misclassify objects of class C as class B, but not as class A or D. Thus, the classifier is not sufficient for distinguishing objects of class B from objects of class C. Even though the classifier may misclassify objects of class A as class D or vice versa, but the error rate is less than 5%. Therefore, classes B and C may be grouped into a disjoint error subgroup of (B, C), and classes A and D may be grouped into a good subgroup (A, D). If the acceptable error rate is below 1%, classes A and D may be grouped into another disjoint error subgroup of (A, D), in addition to disjoint error subgroup (B, C). In the example shown in Table 1, no errors cross different disjoint error subgroups. In some embodiments, classes can be grouped into different subgroups even if there are classification errors across different subgroups, so long as the classification errors across different subgroups are less than an acceptable rate.

If the confusion matrix shows no unacceptable misclassification, the classifier is sufficient to classify objects from all classes. If the confusion matrix shows one disjoint error subgroup that includes all members of possible classes, that is, the classifier cannot break all members of possible classes into any smaller subgroup, the classifier is insufficient to correctly identify any object from any class with an acceptable confidence level. This may indicate that different features may need to be extracted from the training data samples.

3. Layered Reduced Enhanced Gaussian Classifier

After the disjoint error subgroups of classes in the group of classes are identified, a reduced enhanced Gaussian classifier in a next layer may be designed for each disjoint error subgroup using the same method as described above recursively, until all classes in each disjoint error subgroup can be properly classified or no smaller disjoint error subgroup(s) can be identified. At each layer, it is determined whether the layer is a final layer where no smaller error subgroup(s) can or need to be identified. In some embodiments, features used in the layer and/or disjoint error subgroups that result in a lower layer are recorded.

Figure 7:
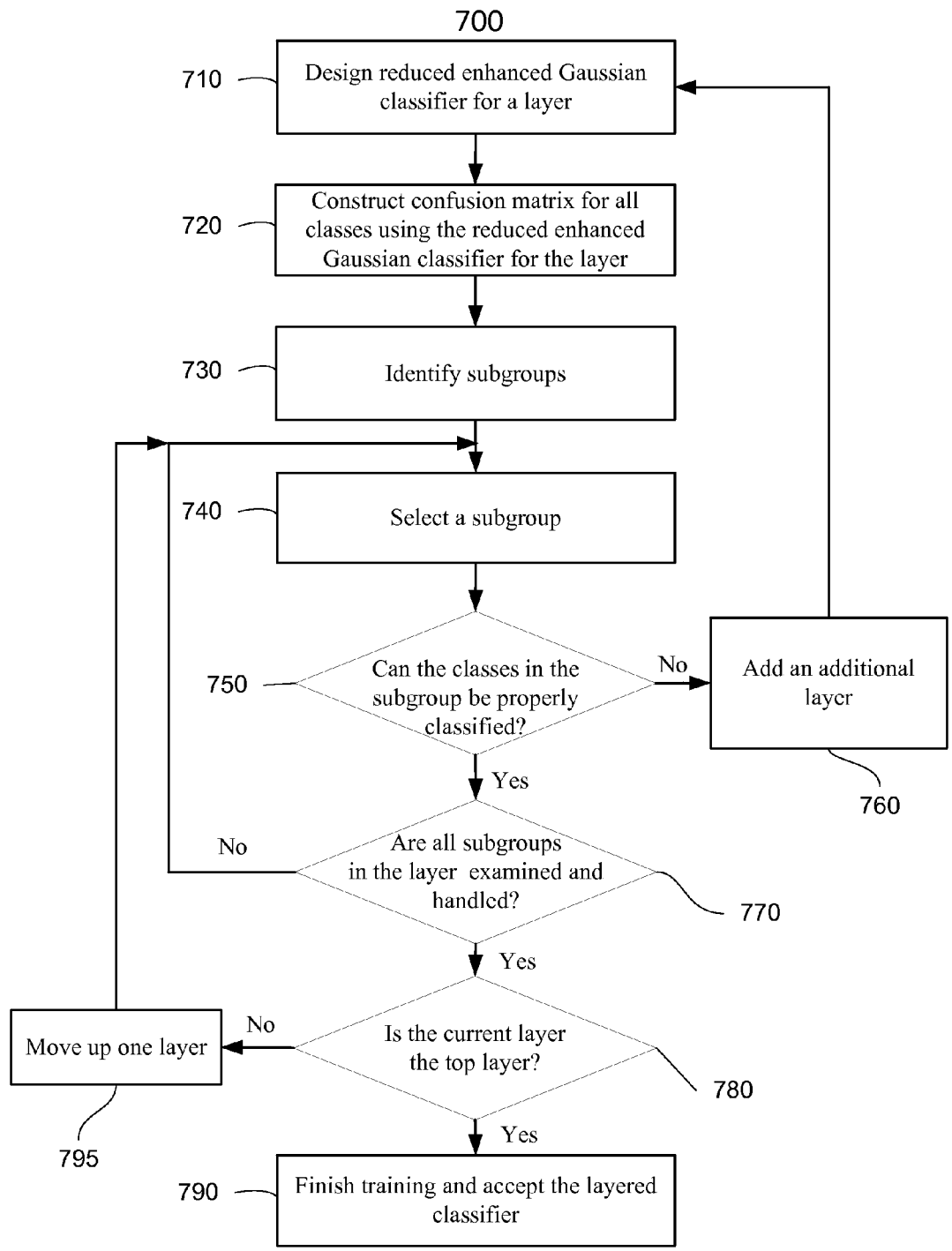
FIG. 7 is a flow chart illustrating a method of building a layered reduced enhanced Gaussian classifier using confusion matrices.

FIG. 7 is a flow chart 700 illustrating a method of building a layered classifier using the above-described reduced enhanced Gaussian classifiers and confusion matrices recursively.

At block 710, a reduced enhanced Gaussian classifier can be built for a group or a subgroup of object classes at a layer using the method described above in Section III(A)(1). At block 720, a confusion matrix is constructed for the group or the subgroup of object classes using the training data samples and the reduced enhanced Gaussian classifier designed for the group or the subgroup of object classes at the layer as described above in Section III(A)(2).

At block 730, the group or subgroup of object classes may be divided into a plurality of subgroups, such as disjoint error subgroups described above in the present disclosure, or a subgroup of object classes that can be properly classified at the layer by the reduced enhanced Gaussian classifier.

At block 740, each subgroup of the plurality of subgroups is selected at a time. At block 750, the subgroup is examined to determine whether object classes in the subgroup can be properly identified. If the answer is no, an additional layer is added for the subgroup at block 760, and processes at blocks 710-750 may be performed using only training data samples from the subgroup of object classes. If the answer at block 750 is yes, whether all subgroups in the layer have been examined and handled can be determined at block 770. If not, the training process moves to block 740, and a new subgroup is selected and examined to determine whether an additional layer is needed. A new reduced enhanced Gaussian classifier can be designed for the new subgroup if necessary, until all subgroups in the layer have been examined and handled. After all identified subgroups in the current layer are examined and handled, the training process determines whether the current layer is the top layer at block 780. If the current layer is the top layer, which means that all classes in the group of object classes are handled, the layered classifier can be accepted as the classifier for the group of object classes, and the training process finishes at block 790. If the current layer is not the top layer, the training process moves up one layer to an upper layer and restarts at block 740 by selecting a new subgroup in the upper layer for examination and handling.

Figure 8:
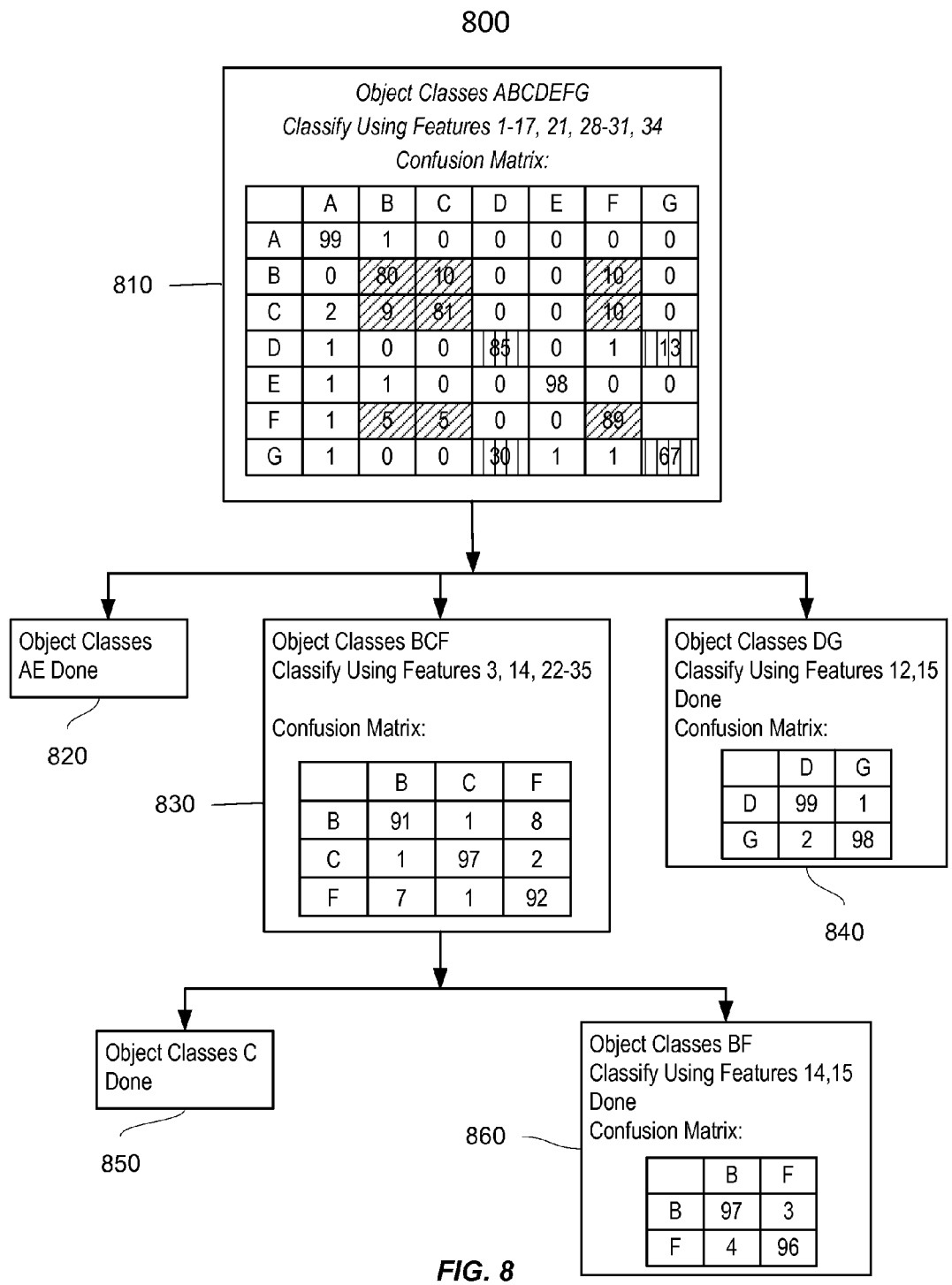
FIG. 8 illustrates an example of building a layered reduced enhanced Gaussian classifier using confusion matrices.

FIG. 8 illustrates a block diagram 800 showing an example of building a layered reduced enhanced Gaussian classifier using confusion matrices. A confusion matrix 810 is built for a group of object classes A to G classified by a classifier using features 1-17, 21, 28-31 and 34, where the classifier is the best classifier identified for the group of object classes A to G. As shown in confusion matrix 810, objects from object classes A and E can be classified correctly with an acceptable classification error rate, such as no more than 5%, even though 1% of objects from class A may be classified as class B, 1% of objects from class E may be classified as class A, and 1% of objects from class E may be classified as class B. Thus, classes A and E may form a group of classes 820 that can be properly classified by features 1-17, 21, 28-31 and 34. Objects from object classes B, C, D, F and G may not be properly classified with an acceptable error rate or confidence level. Thus, additional classifier(s) on additional layer(s) may be needed to further classify these objects. From confusion matrix 810, it can be seen that most of the confusions or misclassifications happen within the subgroup of classes B, C and F, and the subgroup of classes D and G, while misclassifications across the two subgroups are minimal and can be ignored. Thus, additional classifier(s) on additional layer(s) are needed for the subgroup of classes B, C and F, and the subgroup of classes D and G.

Confusion matrix 830 illustrates the classification results of objects from the subgroup of classes B, C, and F by a reduced enhanced Gaussian classifier using features 3, 14 and 22-35. As shown in confusion matrix 830, objects from class C can be correctly classified 97% of the time, while more than 5% of objects from class B or D are misclassified by the classifier. Furthermore, the misclassifications of objects from classes B and D are mostly between class B and class D. Thus class C may form a subgroup 850, and objects classified as class C by the classifier using features 3, 14 and 22-35 may be accepted as belonging to class C with sufficient confidence level, while classes B and D may form a disjoint error subgroup, and objects classified as either class B or D may need to be further classified in a new layer by an additional classifier.

Confusion matrix 860 illustrates the classification results of objects from the disjoint error subgroup of classes B and F by a reduced enhanced Gaussian classifier using features 14 and 15. As shown in confusion matrix 860, more than 95% of objects from either class B or class F can be correctly classified by the classifier using features 14 and 15, and thus the classifier is considered sufficient for distinguishing objects of class B from objects of class F.

With respect to the subgroup of classes D and G, a classifier using features 12 and 15 is selected and used to classify objects from classes D and G. The classification results are summarized in confusion matrix 840, which shows that objects from both class D and class G can be correctly classified with an acceptable error rate or confidence level.

In summary, with the above four classifiers in 3 layers, objects from the group of classes A to G can be correctly classified with an acceptable error rate using the layered classifier. Objects from classes A and E can be properly classified by the classifier in the top layer. Objects from classes D and G can be properly classified by a combination of the classifier in the top layer and the classifier using features 12 and 15 in the second layer. Objects from class C can be properly classified by a combination of the classifier in the top layer and the classifier using features 3, 14 and 22-35 in the second layer. Objects from classes B and F can be properly classified by a combination of the classifier in the top layer, the classifier using features 3, 14 and 22-35 in the second layer, and the classifier using features 14 and 15 in the third layer.

A skilled person would understand that the acceptable error rate may be set to any suitable value depending on the actual application and the desired confidence level of the classification. For example, in military or aerospace objects classification, a much higher confidence level or a much lower error rate, such as less than about 1%, less than about 0.1%, less than about 0.01%, or even less than about 1 ppm may be desired. For object classification in some applications, a higher error rate, such as 10%, may be acceptable.

B. Classification Using a Layered Gaussian Classifier

Figure 9:
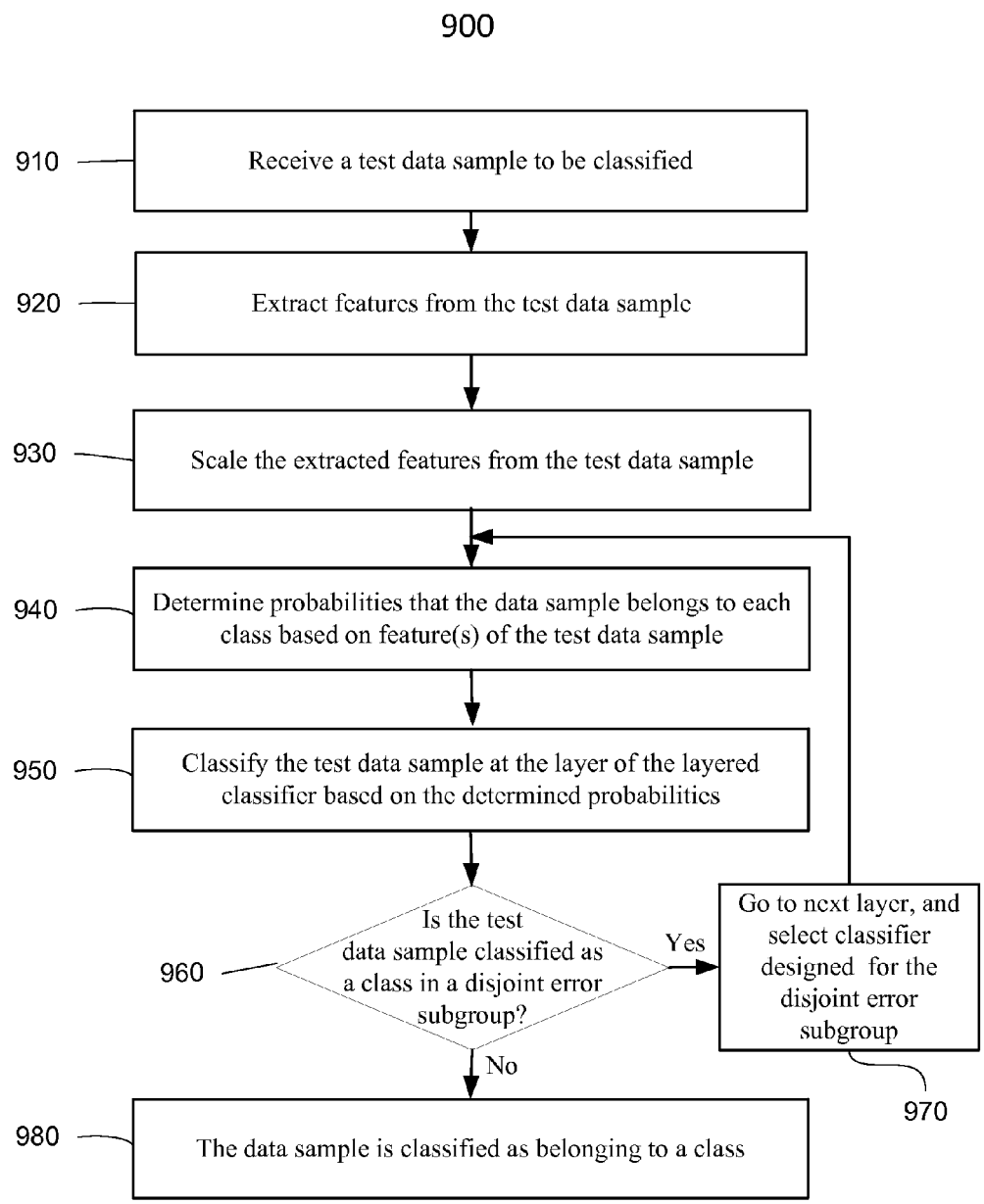
FIG. 9 is a flow chart illustrating a method of classifying test samples using a layered reduced enhanced Gaussian classifier.

FIG. 9 is a flow chart 900 illustrating a method of classifying test samples using a layered reduced enhanced Gaussian classifier. The method includes (1) receiving a test data sample to be classified by the layered classifier at block 910; (2) extracting features from the test data sample to form a feature vector at block 920 using a plurality of feature extractors; and (3) scaling the extracted features in the feature vector using appropriate scaling factors at block 930. The processes of feature extraction and scaling may be similar to the processes performed at blocks 120-140 of FIG. 1 and blocks 520-540 in FIG. 5.

The classification method may further include estimating the probability or confidence level that the test data sample is an object of each class of a group of possible classes at block 940, based on the scaled feature vector of the test data sample; and classifying the test data sample as an object of a class at block 950 based on the maximum estimated probability at block 940. If it is determined that the test data sample is classified as a class in a disjoint error subgroup at block 960, an additional classifier in an additional layer may be selected at block 970, and the test data sample is further classified at block 940 and 950 using the additional classifier. Processes at blocks 940-970 may need to be performed recursively if additional classifier(s) in additional layer(s) is needed to properly classify the test data sample. If, at any recursion, the test data sample can be classified as belonging to a class with an acceptable error rate, the classification ends and the result is reported at block 980.

IV. Examples

The method disclosed herein may be used in many applications, such as automatic classification of a received radio signal to determine the class of the radio signal, for example, an FM-broadcast signal, an FM-voice signal, a GSM signal, a CDMA signal, a military Link-11 digital transmission signal, or any other radio signal listed in Table 2 below.

Figure 10:
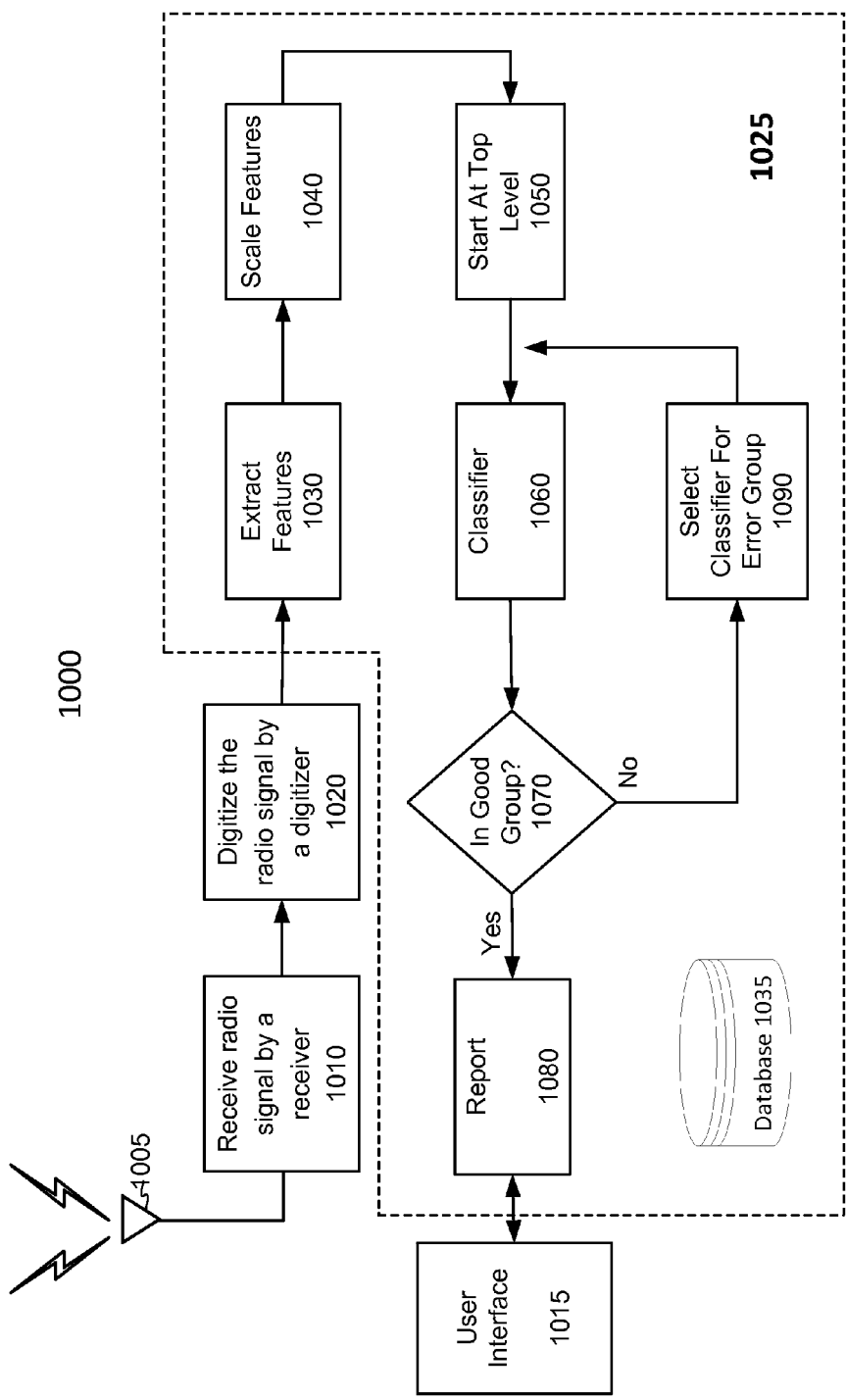
FIG. 10 illustrates an example radio communication system with a radio frequency signal classifier.

FIG. 10 illustrates an example radio communication system 1000 with a radio frequency signal classifier using a layered reduced enhanced Gaussian classifier as described in the present disclosure. Radio communication system 1000 may include an antenna 1005 and a radio frequency receiver 1010 for receiving and capturing a radio frequency signal; a digitizer for digitizing the received radio frequency signal, which may include a down-convertor and a baseband analog-to-digital convertor, or an intermediate frequency analog-to-digital convertor; and a computer system 1025 for receiving and classifying the digitized radio frequency signal. Although the illustrated embodiment in FIG. 10 relates to a radio communications system, the present invention is not limited to this particular implementation and is more broadly applicable to classification systems for objects including photographs, video data, spectroscopic data, and the like. One of ordinary skill in the art would recognize many variations, modifications, and alternatives.

Computer system 1025 may be any computing device capable of executing programming codes including a functional block 1030 for extracting features from data samples, as described above with respect to, for example, block 120 of FIG. 1, FIG. 2, and block 420 of FIG. 4. The program codes may also include a functional block 1040 for scaling extracted features, as described above with respect to, for example, block 130 of FIG. 1, FIG. 3, and block 430 of FIG. 4; a functional block 1050 for starting the classification at the top layer; a reduced enhanced Gaussian classifier 1060 for classifying data samples, as described above with respect to, for example, FIG. 6; a functional block 1070 for determining whether the resultant class from classifier 1060 is in a good group or an error group, as described above with respect to, for example, FIGS. 8 and 9; a functional block 1090 for selecting a new classifier for the error group, as described above with respect to, for example, FIG. 9; and a functional block 1080 for reporting the final classification result. Classifier 1060, functional block 1070, and functional block 1090 may be performed recursively until the resultant class is in a good group.

Computer system 1025 may include or communicate with a user interface 1015 for receiving user input or displaying reports or results to a user. User interface 1015 may include a keyboard, a mouse, a monitor and other input/output (I/O) devices.

Computer system 1025 may also include a database 1035 for storing data such as parameters of radio signals from various radio communication standards, training data samples, feature vectors, mean vectors, covariance matrices, designed classifiers, confusion matrixes, and disjoint error groups as described above.

V. System Example

Figure 11:
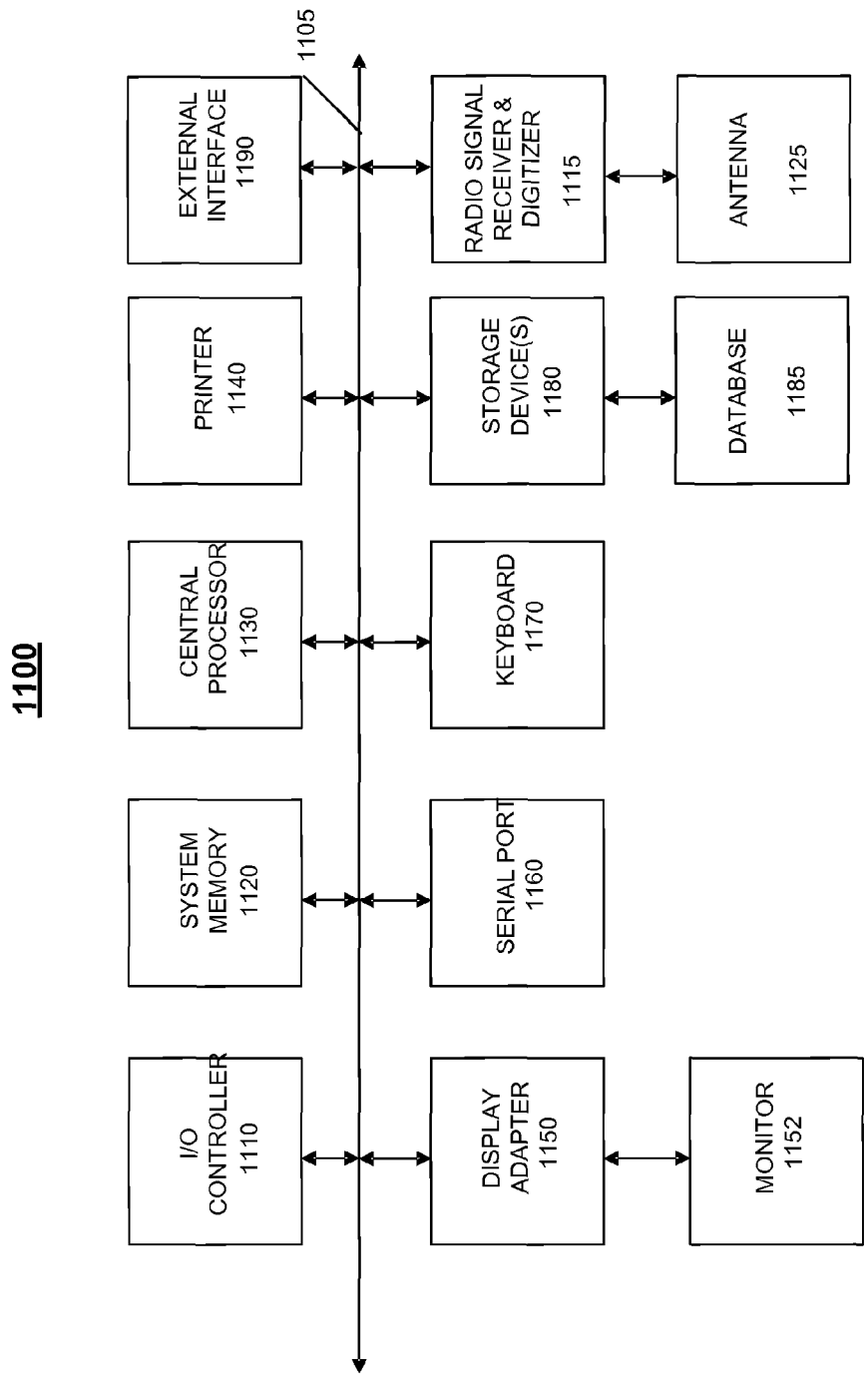
FIG. 11 is a block diagram of a computing device on which layered reduced enhanced Gaussian classifiers according to various embodiments of the present disclosure may be implemented.

Any of the computer systems mentioned herein may utilize any suitable number of subsystems. Examples of such subsystems are shown in FIG. 11 in computer system 1100. In some embodiments, a computer system includes a single computer apparatus, where the subsystems can be components of the computer apparatus. In other embodiments, a computer system can include multiple computer apparatuses, each being a subsystem, with internal components. A computer system can include desktop and laptop computers, tablets, mobile phones and other mobile devices, work stations, local servers, remote servers, cloud servers, distributed computer systems, or super computers.

The subsystems shown in FIG. 11 are interconnected via a system bus 1105. Additional subsystems such as a printer 1140, a keyboard 1170, storage device(s) 1180, a monitor 1152, which is coupled to display adapter 1150, and others are shown. Peripherals and input/output (I/O) devices, which couple to I/O controller 1110, can be connected to the computer system by any number of means known in the art, such as a serial port 1160. For example, serial port 1160 or external interface 1190 (e.g. Ethernet, Wi-Fi, etc.) can be used to connect computer system 1100 to a wide area network such as the Internet, a mouse input device, or a scanner. The interconnection via system bus 1105 allows a central processor 1130 to communicate with each subsystem and to control the execution of instructions from system memory 1120 or storage device(s) 1180 (e.g., a fixed disk), as well as the exchange of information between subsystems. System memory 1120 and/or storage device(s) 1180 may embody a computer-readable medium. Any of the values mentioned herein can be output from one component to another component and can be output to the user.

Computer system 1100 may include a database 1185 stored in or coupled to storage device 1180. Database 1185 may be used to store characteristics of objects of different classes, data samples, or other data used in the classification, as described above with respect to database 1035 of FIG. 10. In one embodiment, database 1185 may store characteristics of radio signals of different radio communication standards.

Computer system 1100 may also include an antenna 1125 and radio signal receiver and digitizer 1115 for receiving radio frequency signals and digitizing the received radio frequency signals. The antenna may be a wideband antenna or narrow band antenna. Antenna 1125 may be an antenna at high Frequency (HF), very high frequency (VHF), ultra-high frequency (UHF), super high frequency (SHF), extremely high frequency (EHF), or higher frequency. Radio signal receiver and digitizer 1115 may tune to different frequency bands, demodulate radio signals, and digitizer the radio signals for digital signal processing. Radio signal receiver and digitizer 1115 may include a tuner, a low noise amplifier, a filter, and an analog-to-digital convertor. Radio signal receiver and digitizer 1115 may also include a transmitter for transmitting radio signals.

A computer system can include a plurality of same components or subsystems, for example, connected together by external interface 1190 or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application-specific integrated circuit or field-programmable gate array) and/or using computer software with a generally programmable processor in a modular or integrated manner. As used herein, a processor includes a single-core processor, multi-core processor on a same integrated chip, or multiple processing units on a single circuit board or network. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Matlab, Perl or Python using, for example, conventional or object-oriented techniques. The software code may be stored as a series of instructions or commands on a computer-readable medium for storage and/or transmission. A suitable non-transitory computer-readable medium can include random access memory (RAM), a read-only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices.

Such programs may also be encoded and transmitted using carrier signals adapted for transmission via wired, optical, and/or wireless networks conforming to a variety of protocols, including the Internet. As such, a computer-readable medium according to an embodiment of the present invention may be created using a data signal encoded with such programs. Computer-readable media encoded with the program code may be packaged with a compatible device or provided separately from other devices (e.g., via Internet download). Any such computer-readable medium may reside on or within a single computer product (e.g. a hard drive, a CD, or an entire computer system) and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

It is also understood that the examples and embodiments described herein are for illustrative purposes only and that various modifications or changes in light thereof will be suggested to persons skilled in the art and are to be included within the spirit and purview of this application and scope of the appended claims.

According to an embodiment of the present invention, the methods and systems described herein are applicable to a wide variety of signal classes. As an example, the signal classes illustrated in Table 2 may be utilized in accordance with embodiments of the present invention.

TABLE 2

| Signal Name | Classifier Name | Modulation Type |
|---|---|---|
| 'MCCW' | 'MCCW' | 'MCCW' |
| 'MCOOK' | 'MCOOK' | 'MCOOK' |
| 'MCBFSK' | 'MCBFSK' | 'MCBFSK' |
| 'FM-BFSK' | 'FMBFSK' | 'FM-BFSK' |
| 'FM-BPSK' | 'FMBPSK' | 'FM-BPSK' |
| 'FM-OOK' | 'FMOOK' | 'FM-OOK' |
| 'ACARS' | 'ACARS' | 'AM-MSK' |
| 'AM-DSB-TC' | 'DSB' | 'AM-DSB-TC' |
| 'CIVIL-AVIATION' | 'CIVIL-AVIATION' | 'AM-DSB-TC' |
| 'AM-DSB-SC' | 'DSBSC' | 'AM-DSB-SC' |
| 'AM-ISB-TC' | 'ISB' | 'AM-ISB-TC' |
| 'AM-ISB-SC' | 'ISBSC' | 'AM-ISB-SC' |
| 'AM-LSB' | 'LSB' | 'AM-LSB' |
| 'AM-USB' | 'USB' | 'AM-USB' |
| 'CW' | 'CW' | 'CW' |
| 'FMN' | 'FMN' | 'FMN' |
| 'MILITARY-AVIATION' | 'MILITARY-AVIATION' | 'FMN' |
| 'FMBroadcast' | 'FMW' | 'FMW' |
| 'BPSK' | 'BPSK-1200' | 'BPSK' |
| 'BPSK' | 'BPSK-2400' | 'BPSK' |
| 'MSK' | 'MSK' | 'MSK' |
| 'GMSK' | 'GMSK' | 'GMSK' |
| 'GSM-900' | 'GSM-900' | 'GMSK' |
| 'GSM-1800' | 'GSM-1800' | 'GMSK' |
| 'GSM-1900' | 'GSM-1900' | 'GMSK' |
| 'MORSE' | 'MORSE' | 'OOK' |
| 'OOK' | 'OOK' | 'OOK' |
| 'PAM' | 'PAM' | 'PAM' |
| 'BFSK' | 'BFSK-2000' | 'BFSK' |
| 'BFSK' | 'BFSK-1200' | 'BFSK' |
| 'BFSK' | 'BFSK-600' | 'BFSK' |
| 'BFSK' | 'BFSK-300' | 'BFSK' |
| 'BFSK' | 'BFSK-150' | 'BFSK' |
| 'BFSK' | 'BFSK-75' | 'BFSK' |
| '4PAM' | '4PAM' | '4PAM' |
| 'QASK' | 'QASK' | 'QASK' |
| 'QFSK' | 'QFSK' | 'QFSK' |
| 'FLEX' | 'FLEX-6400' | 'QFSK' |
| 'QPSK' | 'QPSK' | 'QPSK' |
| '8ASK' | '8ASK' | '8ASK' |
| '8FSK' | '8FSK' | '8FSK' |
| 'MFSK-8' | 'MFSK-8' | '32FSK' |
| '8PSK' | '8PSK' | '8PSK' |
| '8QAM-V29-7200' | '8QAM-V29-7200' | '8QAM' |
| '16ASK' | '16ASK' | '16ASK' |
| '16PSK' | '16PSK' | '16PSK' |
| '16QAM' | '16QAM' | '16QAM' |
| '16FSK' | '16FSK' | '16FSK' |
| 'MFSK-16' | 'MFSK-16' | '16FSK' |
| '32ASK' | '32ASK' | '32ASK' |
| '32PSK' | '32PSK' | '32PSK' |

TABLE 2-continued

| Signal Name | Classifier Name | Modulation Type |
|---|---|---|
| '32QAM' | '32QAM' | '32QAM' |
| 'V32bis-7200' | 'V32bis-7200' | '16QAM' |
| 'V32bis-9600' | 'V32bis-9600' | '32QAM' |
| '32FSK' | '32FSK' | '32FSK' |
| '64QAM' | '64QAM-1200' | '64QAM' |
| '64QAM' | '64QAM-2400' | '64QAM' |
| '64FSK' | '64FSK' | '64FSK' |
| '64PSK' | '64PSK' | '64PSK' |
| 'CIS-36-50-IDLE' | 'CIS-36-50-IDLE-85' | 'BFSK' |
| 'CIS-36-50-IDLE' | 'CIS-36-50-IDLE-125' | 'BFSK' |
| 'CIS-36-50-IDLE' | 'CIS-36-50-IDLE-250' | 'BFSK' |
| 'CIS-36-50-IDLE' | 'CIS-36-50-IDLE-500' | 'BFSK' |
| 'CIS-36-50-DATA' | 'CIS-36-50-DATA-85' | 'BFSK' |
| 'CIS-36-50-DATA' | 'CIS-36-50-DATA-125' | 'BFSK' |
| 'CIS-36-50-DATA' | 'CIS-36-50-DATA-250' | 'BFSK' |
| 'CIS-36-50-DATA' | 'CIS-36-50-DATA-500' | 'BFSK' |
| 'POCSAG' | 'POCSAG' | 'BFSK' |
| 'Piccolo-6' | 'Piccolo-6' | 'MFSK-6' |
| 'Piccolo-12' | 'Piccolo-12' | 'MFSK-12' |
| 'PRESSFAX' | 'PRESSFAX' | 'SSB' |
| 'SAT-C-TDMA' | SAT-C-TDMA' | 'BPSK' |
| 'TETRA' | 'TETRA' | 'QPSK' |
| 'MIL-188-141A' | 'MIL-188-141A' | '8FSK' |
| 'Link-11' | 'Link11-CLEW' | 'MCQPSK' |
| 'V21' | 'V21' | 'BFSK' |
| 'V22' | 'V22' | 'DQPSK' |
| 'V22bis' | 'V22bis' | '16QAM' |
| 'V26' | 'V26' | 'DQPSK' |
| 'V29-4800' | 'V29-4800' | 'DQPSK' |
| 'V29-9600' | 'V29-9600' | '16QAM' |
| 'V32bis-14400' | V32bis-14400' | '128QAM' |
| 'BR-6028' | 'BR-6028' | 'MCBFSK' |
| 'CLOVER' | 'CLOVER' | '2DPSM' |
| 'Coquelet-13' | 'Coquelet-13' | 'MFSK-13' |
| 'Coquelet-80' | 'Coquelet-80' | 'MFSK-8' |
| 'MIL-188-110A' | 'MIL-188-110A' | '8PSK' |
| 'MIL-188-110-39tone' | 'MIL-188-110-39tone' | 'MC-QDPSK' |
| 'AX25-300' | 'AX25-300' | 'BFSK' |
| 'AX25-1200' | 'AX25-1200' | 'BFSK' |
| 'AX25 -9600' | 'AX25 -9600' | 'GFSK' |
| 'PACTOR' | 'PACTOR' | 'BFSK' |
| 'MT63' | 'MT63' | 'MCBPSK' |
| 'CODAN' | 'CODAN' | 'MCQPSK' |
| 'IS-95A' | 'IS-95A' | 'DSSS' |
| 'CDMA2000-1xEVDO' | 'CDMA2000-1xEVDO' | 'QPSK-DSSS' |
| 'IEEE-802.11a' | 'IEEE802.11a' | 'OFDM' |
| 'IEEE-802.11b' | 'IEEE802.11b' | 'DSSS' |
| 'IEEE-802.11g-DSSS' | 'IEEE802.11g-PBCC' | 'DSSS' |
| 'IEEE-802.11g-OFDM' | 'IEEE802.11 g-OFDM' | 'OFDM' |
| 'TACAN' | 'TACAN' | 'PPM' |
| 'CROWD36' | 'CROWD36' | 'MFSK' |
| 'VDL2' | 'VDL2' | 'D8PSK' |
| 'APCO25-C4FM' | APCO25-C4FM' | '4FSK' |
| 'APCO25-CQPSK' | 'APCO25-CQPSK' | 'QPSK' |
| 'FM-MC' | 'FM-MC' | 'FM-MCFM' |
| 'UHF-PAL' | 'PAL' | 'PAL' |

A recitation of "a," "an" or "the" is intended to mean "one or more" unless specifically indicated to the contrary. The term "class" and "type" may be used interchangeably herein.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

What is claimed is:

1. A method of radio signal identification using a layered radio signal classifier, the method comprising:
   receiving a plurality of training data samples of radio signals, wherein the plurality of training data samples includes radio signals from a plurality of radio signal classes;
   extracting a plurality of training features from each of the plurality of training data samples;
   determining mutual information between each training feature of the plurality of training features and a radio signal classification decision for the plurality of radio signal classes;
   ranking the plurality of training features based on the mutual information;
   designing a plurality of Gaussian classifiers using the plurality of training features based on the ranking of the plurality of training features;
   selecting, from the plurality of Gaussian classifiers, a Gaussian classifier with the lowest classification error rate for the plurality of training data samples as a reduced enhanced Gaussian classifier for a first layer;
   classifying the plurality of training data samples using the reduced enhanced Gaussian classifier for the first layer;
   generating a confusion matrix summarizing the radio signal classes that training data samples from each radio signal class are classified as;
   identifying a disjoint error subgroup of radio signal classes based on the confusion matrix, wherein a rate of misclassification of training data samples from each radio signal class of the disjoint error subgroup of radio signal classes is above a first threshold, and wherein a rate of misclassification between radio signal classes within the disjoint error subgroup and radio signal classes outside of the disjoint error subgroup is below a second threshold value;
   designing a different reduced enhanced Gaussian classifier in a lower layer for the disjoint error subgroup of radio signal classes;
   receiving a target radio signal to be classified;
   extracting a plurality of target features from the target radio signal;
   classifying the target radio signal as belonging to a radio signal class in a subgroup of correctly classified radio signal classes or in the disjoint error subgroup that needs further classification, using the reduced enhanced Gaussian classifier for the first layer and at least one of the plurality of target features; and
   if the target radio signal is classified as belonging to a radio signal class in the disjoint error subgroup, classifying the target radio signal using the different reduced enhanced Gaussian classifier in the lower layer for the disjoint error subgroup.

2. The method of claim 1 wherein the plurality of radio signal classes includes at least one of a MIL-188 signal, a QAM signal, a BPSK signal, or an FSK signal.

3. The method of claim 1 wherein the plurality of radio signal classes include at least one of an AM-voice signal, an FM-voice signal, an FM-broadcast signal, a Link-11 military transmission signal, a GSM signal, or a CDMA signal.

4. The method of claim 1 wherein the plurality of training features includes at least one of a signal bandwidth, $n^{th}$ order signal cumulants, or a coherence metric.

5. The method of claim 1 further comprising scaling values of each training feature of the plurality of training features extracted from the plurality of training data samples using a standard deviation of the values of each training feature extracted from the plurality of training data samples.

6. The method of claim 1 wherein designing the different reduced enhanced Gaussian classifier in the lower layer for the disjoint error subgroup of radio signal classes uses training data samples from only the disjoint error subgroup of radio signal classes.

7. The method of claim 1 wherein each Gaussian classifier of the plurality of Gaussian classifiers is a maximum a-posteriori classifier or a maximum likelihood classifier.

8. The method of claim 1 wherein the target radio signal is classified as belonging to a radio signal class in the subgroup of correctly classified object classes if a classification error rate of the reduced enhanced Gaussian classier for the first layer for the radio signal class is less than the first threshold value.

9. The method of claim 1 further comprising conditioning a covariance matrix for each object class using Tikhonov regularization.

10. A method of designing a layered classifier for object classification, the method comprising:
receiving a plurality of training data samples, wherein the plurality of training data samples includes objects from a plurality of object classes to be classified in a layer of the layered classifier;
extracting a plurality of features from each of the plurality of training data samples;
determining mutual information between each feature of the plurality of features and an object classification decision for the plurality of object classes;
ranking the plurality of features based on the mutual information;
designing a plurality of Gaussian classifiers using the plurality of features based on the ranking of the plurality of features; and
selecting, from the plurality of Gaussian classifiers, a Gaussian classifier with the lowest classification error rate for the plurality of training data samples as a reduced enhanced Gaussian classifier for the layer.

11. The method of claim 10 further comprising:
classifying the plurality of training data samples using the reduced enhanced Gaussian classifier for the layer;
generating a confusion matrix, the confusion matrix summarizing the object classes that training data samples from each object class are classified as;
identifying a disjoint error subgroup of object classes based on the confusion matrix, wherein a rate of misclassification of training data samples from each object class of the disjoint error subgroup of object classes is above a first threshold, and wherein a rate of misclassification between object classes within the disjoint error subgroup and object classes outside of the disjoint error subgroup is below a second threshold value; and
designing a different reduced enhanced Gaussian classifier in a lower layer for the disjoint error subgroup of object classes.

12. The method of claim 11 further comprising:
identifying a subgroup of distinguishable object classes, wherein a rate of misclassification of training data samples from each object class of the subgroup of distinguishable object classes is below the first threshold value.

13. The method of claim 10 wherein each Gaussian classifier of the plurality of Gaussian classifiers classifies an object based on a probability that the object belongs to each object class of the plurality of object classes, wherein the probability is determined at least partially using a covariance matrix for each object class of the plurality of object classes.

14. The method of claim 13 further comprising condition the covariance matrix for each object class using Tikhonov regularization.

15. The method of claim 10 wherein the objects are radio frequency signals.

16. The method of claim 10 wherein a number of object classes of the plurality of object classes is more than 40.

17. The method of claim 10 wherein the plurality of features includes statistical measures in time domain or frequency domain.

18. The method of claim 10 wherein the objects include at least one of photographs, hyperspectral images, or spectrograms.

19. A layered reduced enhanced Gaussian classifier, comprising:
a plurality of feature extractors configured to extract a plurality of features from an object; and
a plurality of classification layers, wherein each of the plurality of classification layers includes one or more reduced enhanced Gaussian classifiers,
wherein each of the one or more reduced enhanced Gaussian classifiers is selected from a plurality of Gaussian classifiers based on a classification error rate of each of the plurality of Gaussian classifiers;
wherein each of the one or more reduced enhanced Gaussian classifiers is configured to classify the object as belonging to an object class in a subgroup of correctly classified object classes or in a disjoint error subgroup that needs further classification, using at least one of the extracted plurality of features; and
wherein, if the object is classified as belonging to an object class in a disjoint error subgroup at a layer, the object is passed on to a different reduced enhanced Gaussian classifier in a next layer for further classification.

20. The layered reduced enhanced Gaussian classifier of claim 19 further comprising a functional block for scaling each feature of the extracted plurality of features using a standard deviation of the each feature.

21. The layered reduced enhanced Gaussian classifier of claim 19 wherein each of the plurality of Gaussian classifiers uses a different combination of features of the plurality of features based on a mutual information between each feature of the plurality of features and an object classification decision.

22. The layered reduced enhanced Gaussian classifier of claim 19 wherein at least one of the one or more reduced enhanced Gaussian classifiers in one of the plurality of layers uses only a portion of the plurality of features.

* * * * *